United States Patent Office 3,527,054
Patented Sept. 8, 1970

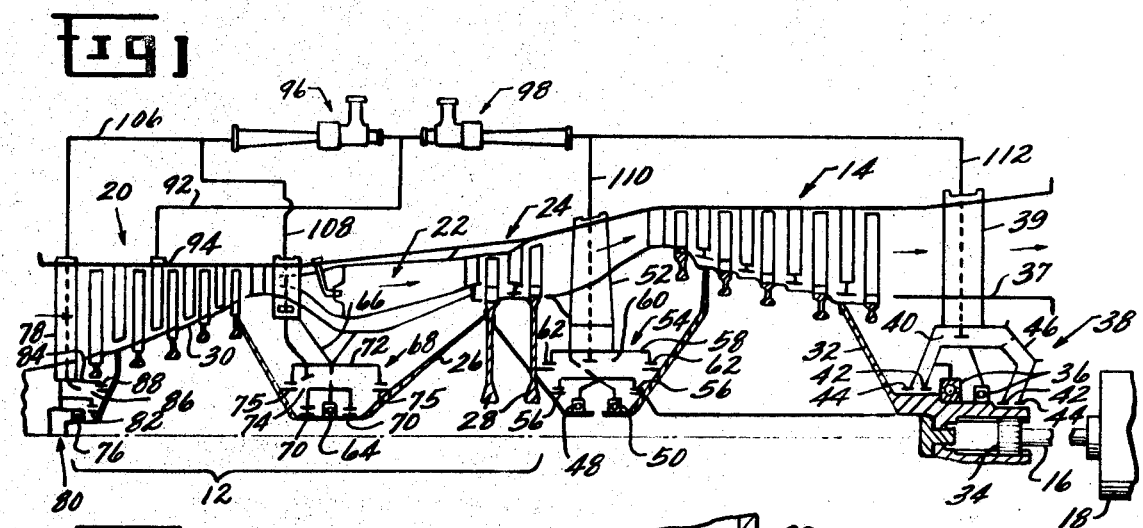
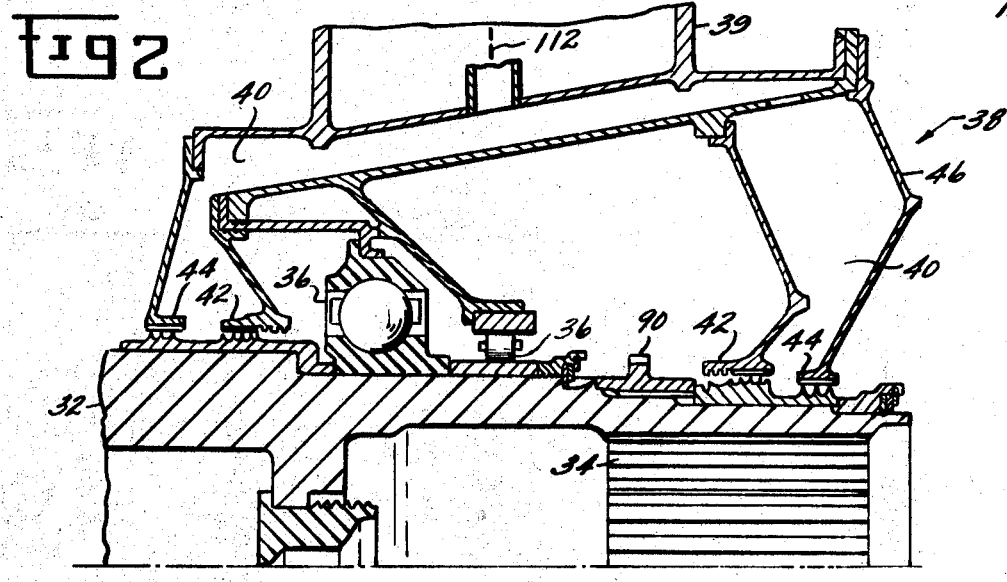
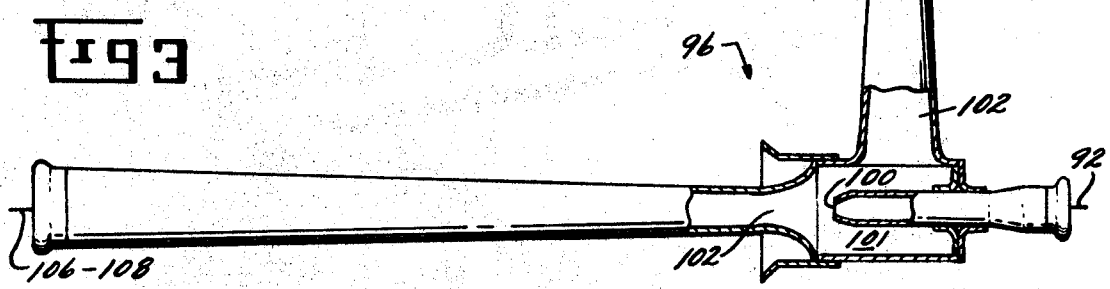
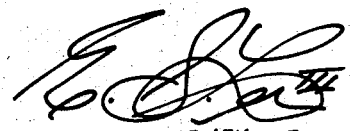

3,527,054
PRESSURIZATION OF LUBRICATION SUMPS IN GAS TURBINE ENGINES
Martin C. Hemsworth, Cincinnati, Ohio, assignor to General Electric Company, a corporation of New York
Filed Jan. 23, 1969, Ser. No. 793,293
Int. Cl. F02c 7/06, 7/28
U.S. Cl. 60—39.66   2 Claims

ABSTRACT OF THE DISCLOSURE

Air is bled from an intermediate stage of a compressor in a gas turbine engine to provide motive fluid for a pair of eductors. The eductors have secondary inlets, open to relatively cool ambient air. The eductors discharge mixed compressor and ambient air to pressurization chambers surrounding annular seals between the engine rotors and stationary lubrication sumps. The arrangement assures sufficient pressure and relatively cool air, under all operating conditions, for maintaining a pressure in the pressurization chambers sufficient to prevent oil loss through the annular sump seals.

---

The present invention relates to improvements in gas turbine engines and more particularly to improvements in providing low temperature, pressurized air for preventing loss of oil fom sumps in which lubricated bearings and/or gears are mounted.

It is well known, in gas turbine engines, to provide stationary sump chambers for mounting bearings and gears and to provide means for annularly sealing such sumps relative to the rotor of the gas turbine engine. Generally speaking, there is a continuous flow of oil into such sumps which is directed against the bearings and gears to provide a cooling, as well as a lubrication, function. Sump pumps are also employed to draw oil from the sump so that it may be circulated through a cooler before being again discharged into the sump.

It is recognized that annular fluid seals between rotating and stationary parts have some leakage in the forms practical for the operating environment of a gas turbine. It has, therefore, been a conventional practice to pressurize chambers surrounding sump seals so that leakage flow through the seals is into the sumps. This technique prevents loss of oil from the lubrication system because of sump seal leakage.

It has been a prior practice to bleed pressurized air from the compressor of a gas turbine engine and duct it directly to such pressurization chambers. However, where labyrinth tooth seals are used in engines having high pressure ratio compressors, this prior practice is not adequate. Labyrinth tooth seals are highly desirable because of their long life and low cost. However, they inherently have greater leakage than more positive types of annular seals, such as carbon seals. This means that relatively large quantities of air will flow into the lubrication sumps in preventing oil leakage. While the engine compressor is an adequate source from which such air may be derived, temperature is a problem. The reason for this is that in high pressure ratio, multistage compressors, the lower stages of the compressor do not have an adequate, positive pressure at lower operating speeds. If air is bled from a higher compressor stage having the necessary positive pressure at low speeds, then at high speeds, its temperature, when it leaks into the sumps, is so high that it causes degradation of the oil.

Accordingly, the object of the present invention is to provide, in a simple and economical fashion, pressurization air from a high pressure ratio compressor for preventing leakage of oil from lubrication sumps in a gas turbine engine.

In accordance with the inveniton, air is bled from an intermediate stage of the compressor of a gas turbine engine. This air supplies the primary input to an eductor. The eductor has a secondary input from a source of relatively cool air, preferably ambient air. The output of the eductor is then ducted to one or more chambers, respectively, surrounding annular seals for the lubrication sumps of the engine.

The above and other related objects and features of the invention will be apparent from a reading of the following description of the disclosure found in the accompanying drawing and the novelty thereof pointed out in the appended claims.

In the drawing:

FIG. 1 is a simplified illustration of a gas turbine engine embodying the present invention;

FIG. 2 is an enlarged view of a lubrication sump, seen in FIG. 1; and

FIG. 3 is an enlarged view of an eductor, as seen in FIG. 1.

The gas turbine engine seen in FIG. 1 comprises a core engine or gas generator portion 12 which generates an annular hot gas stream. This gas stream passes to and drives a power turbine 14. The power turbine 14 has an output shaft 16 which may be connected through a flexible coupling 18 to a driven mechanism, as for example an electrical generator.

The gas generator 12 further comprises a compressor 20 which pressurizes air for supporting combustion of fuel in a combustor 22 to generate the referenced hot gas stream. This hot gas stream passes through a gas generator turbine 24 prior to driving the power turbine 14.

This type of an engine is generally referred to as a two-rotor engine in which a tubular shaft 26 is joined at one end to the core engine turbine rotor 28 and at its other end to the compressor rotor 30 in a well-known fashion to form one engine rotor. The second rotor of this engine comprises the power turbine rotor 32 from which the output shaft 16 projects, being connected thereto, as for example by the illustrated, splined connection 34.

The downstream end of the power turbine rotor 32 is journaled by a pair of bearings 36 which are housed within an annular sump 38. The bearings 36 are structurally supported by a frame 37 having struts 39 extending through the hot gas stream to an outer casing. A chamber 40 surrounds the sump 38 and is pressurized, as later described, to prevent leakage of oil. Seals 42 and 44 are provided between the rotor 32 and the walls of sump 38 and walls 46 of chamber 40, respectively.

The upstream end of turbine rotor and downstream end of the gas generator rotor are respectively journaled by bearings 48, 50, supported on a frame 52. An annular sump 54 surrounds these bearings with seals 56 being provided between the sump walls and the respective rotors. An annular casing 58 defines a chamber 60 surrounding the annular seals 56. Seals 62 are provided between the casing 58 and the respective rotors.

The midportion of the gas generator rotor is journaled by a bearing 64 supported on a frame 66. A sump 68 surrounds the bearing 64 and has seals 70 between it and the shaft. A casing 72 defines a chamber 74 surrounding the sump 68 and is provided with seals 75 between it and the rotor.

The forward end of the gas generator rotor is journaled by a bearing 76 supported on a front frame 78. A sump 80 encloses the front end of the rotor and is provided with an annular seal 82 between it and the rotor. A casing 84 defines a chamber 86 surrounding the seal 82 and is provided with seal 88 between it and the rotor.

FIG. 2 shows in greater detail the first described rear sump 38. Oil is continuously discharged against these bearings as well as against gears 90 (one of which is shown), which are employed to drive the oil pump. Oil and air are continuously drawn from the sump by a connection with the suction side of the oil pump. In this fashion a relatively low pressure is maintained in the sump.

FIG. 2 also illustrates that the seals 42 and 44 are of the preferred labyrinth tooth type comprising annular teeth closely spaced from cylindrical sealing surfaces.

It will be apparent that by maintaining a higher pressure in the pressurization chamber 40 than in the sump 38, air flow through seals 42 will prevent, at least substantially, any loss of oil from the sump.

This pressurization air for the chamber 40, as well as for the chambers 60, 74 and 86, is derived from the compressor 20. A conduit 92 is connected to the compressor casing 94 at an intermediate stage of the multistage compressor. The stage selected has sufficient positive pressure during all portions of the engine operating cycle to assure proper pressure in the pressurization chambers through use of means now to be described. Normally, the stage selected for this bleed air will be the lowest stage providing such pressure.

The conduit 92 is connected to the primary inputs of two eductors 96, 98. These eductors may be identical and can take the form of the enlarged view of the eductor 96, shown in FIG. 3. The primary input is discharged from a choked nozzle 100 into an enlarged chamber 101 which has a secondary input in the form of a tube 102 open to ambient air. The action of the nozzle is to entrain secondary air and propel it into a mixing passage 102. Downstream of the mixing passage is a diffuser leading to the eductor discharge. The eductor discharge is thus a mixture of compressor bleed air and ambient air.

The discharge from the eductor 96 is connected, by conduit 106 to chamber 86 and by conduit 108 to chamber 74. The discharge of eductor 98 is connected by conduit 110 to chamber 60 and by conduit 112 to chamber 40. The conduits may be connected to the several chambers through struts normally found in such engines. These struts also provide accessways for the conduits' supply oil to and from the lubrication sumps.

The use of eductors, as described, assures proper pressurization to prevent oil leakage from the sumps. The ambient air maintains this pressurization air at a sufficiently low temperature to prevent oil degradation even when considerable amounts of air are drawn into the sumps and become entrained in the oil.

While the present disclosure illustrates the use of two eductors, the scope of the present inventive concepts envision the use of a single eductor for several sumps or the use of individual eductors for each sump, dependent upon the requirements of a given engine and application.

Having thus described the invention, what is claimed as novel and desired to be secured by Letters Patent of the United States is:

1. A gas turbine engine comprising, a multistage axial flow compressor, combustor and turbine, an engine rotor comprising interconnected compressor and turbine rotors, bearing means journaling said engine rotor, lubrication sump means surrounding said bearing means, annular means for sealing said sump means relative to said engine rotor, pressurization chamber means surrounding said annular sealing means, eductor means comprising primary inlet means connected to a stage of the compressor having a given level of pressurization at all engine operating conditions and secondary inlet means connected to a source of relatively cool, relatively low pressure air, said eductor means having outlet means for the discharge of mixed air having a temperature and pressure intermediate those of the compressor bleed air and the secondary air, and means for ducting said eductor discharge means to said pressurization chamber means.

2. A gas turbine engine as in claim 1 wherein, the sump sealing means comprises labyrinth tooth seals.

References Cited

UNITED STATES PATENTS

| | | | |
|---|---|---|---|
| 2,614,386 | 10/1952 | McLeod et al. | 60—39.08 |
| 2,791,090 | 5/1957 | Hooker | 60—39.08 |
| 3,321,910 | 5/1967 | Davies et al. | 60—39.08 |

CARLTON R. CROYLE, Primary Examiner

U.S. Cl. X.R.

60—39.08; 184—6; 230—207